United States Patent [19]

Mikami et al.

[11] 4,122,127

[45] Oct. 24, 1978

[54] ORGANOPOLYSILOXANE RESIN COMPOUNDS AS ADHESION PROMOTERS

[75] Inventors: Ryuzo Mikami; Katsutoshi Mine, both of Ichihara, Japan

[73] Assignee: Toray Silicone Company, Ltd., Tokyo, Japan

[21] Appl. No.: 751,281

[22] Filed: Dec. 16, 1976

[30] Foreign Application Priority Data

Jan. 16, 1976 [JP] Japan ................................ 51-3183

[51] Int. Cl.$^2$ .......................................... C08L 83/06
[52] U.S. Cl. .................................. 260/825; 156/329; 428/450; 528/18; 528/32; 528/38; 260/33.6 SB
[58] Field of Search ...................... 260/825, 46.5 UA

[56] References Cited

U.S. PATENT DOCUMENTS

| 3,933,729 | 1/1976 | Letoffe | 260/825 |
| 3,960,800 | 6/1976 | Kohl | 260/46.5 UA |
| 3,962,500 | 6/1976 | Smith | 260/825 |

*Primary Examiner*—Wilbert J. Briggs, Sr.
*Attorney, Agent, or Firm*—Robert L. McKellar

[57] ABSTRACT

There is disclosed a composition of matter which is an adhesion promoter for silicone rubbers which adhesion promoter consists of an organopolysiloxane resin mixed with an epoxy functional or alkenyl functional organopolysiloxane.

2 Claims, No Drawings

ORGANOPOLYSILOXANE RESIN COMPOUNDS AS ADHESION PROMOTERS

PRIOR ART

The art of adhering silicone rubbers to various substrates such as metals, glass and ceramics has a long history.

Many methods and compositions have been set forth in the patent literature for obtaining adhesion of various silicone rubbers to various substrates. Such literature includes the use of alkoxysilanes and/or acetoxysilanes as primers for silicone rubbers. Such disclosures can be found in Japanese Patent Publication Number 23895/71. Another system includes the use of silicic acid esters in conjunction with vinylalkoxysilanes and metal salts of organic acids such as disclosed in Japanese Patent Publication No. 10756/67. A further system relates to primer compounds which are mixtures of dinitrosobenzene and methacryloxypropyltrimethoxysilane as in Japanese Patent Publication No. 30397/76, and in Japanese Patent Publication No. 18994/72, polysilazanes are shown as effective primers. In all of these cases, some form of alkoxysilanes or acetoxysilanes is used as a polyfunctional material.

The use of the above materials, however, entails several disadvantages in that unsatisfactory films are formed and rust on metal substrates is formed under the portions of the applied silicone rubber where the adhesion has not been entirely successful. When primers are used on metal substrates, frequently rust is formed upon standing because of the procedures used for forming the primer film. This rust forms sites for incipient detachment and subsequent release of the silicone rubber from the substrate. Also, the rust that is formed is aesthetically unappealing.

The rust problem can be overcome in one way by careful forming of the primer film on the substrates and if care is taken, good adhesion of the primer to the metal substrate can be obtained.

On the other hand, adhesion of the silicone rubber to the primer film is still decreased even if precautions are taken to get a good primer film on the substrate and even when unsaturated organofunctional silanes are added as noted above.

Thus, it is an object of this invention to provide a primer which will overcome the above mentioned disadvantages.

It is also an object of the present invention to provide primers which give excellent adhesion to metals and also give rust-resistance.

It is still further an object of this invention to provide an adhesion promoter which will give good adhesion on many different kinds of substrates.

THE INVENTION

The above objects can be obtained by using this invention which consists of a composition of matter which consists of a mixture of (A) an organopolysiloxane resin which has the general formula

in which formula, R' is a monovalent hydrocarbon group containing 1–8 carbon atoms, $n$ has an average value of 0.90–1.80, X is a hydroxyl group or an alkoxy group, $m$ is such to give a minimum value of 0.01 weight percent of X based on the weight of (A), the sum of $m$ + $n$ does not exceed 3.0, $p$ has a value greater than 1, and (B) an organopolysiloxane represented by the general formula

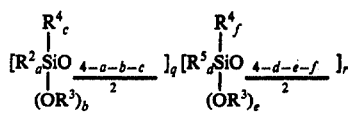

wherein $R^2$ is a monovalent organic group containing at least one epoxy group, $R^3$ and $R^4$ are independently hydrogens or monovalent organic groups, $R^5$ is a monovalent hydrocarbon group containing at least one unsaturated group, $a$, $b$, $c$, $d$, $e$ and $f$ each have the value of 0–3, the sum of $a$, $b$, and $c$ is less than 4 and the sum of $d$, $e$, and $f$ is less than 4, $q$ is 0 or a positive integer and $r$ has a value of 2 or more.

The organopolysiloxane resin (A), has a hydroxyl group or alkoxy group bonded to a silicon atom as the functional group. It has an average of 0.90–1.80 monovalent hydrocarbon groups for each silicon atom. These monovalent hydrocarbon groups contain less than 9 carbon atoms per group and can be methyl groups, vinyl groups, phenyl groups and the like. The organopolysiloxane resins (A) can be used as they are, but organopolysiloxane resins usually need high temperature curing. In view of the uses of primers, it is desirable to use catalysts which enable low temperature curing.

The organopolysiloxane (B), contains unsaturated hydrocarbon or epoxy containing organic radicals and is the important constituent of this invention. It has monovalent organic groups with at least one unsaturated group and/or an epoxy group in every molecule. The monovalent organic groups which have unsaturated groups are exemplified by vinyl groups, allyl groups and methacryloxy groups. The monovalent organic groups which have epoxy groups are exemplified by glycidoxypropyl groups, epoxycyclohexylethyl groups and epoxycyclohexylpropyl groups.

The other monovalent hydrocarbon groups bonded to silicon can be methyl groups, ethyl groups, propyl groups, cyclohexyl groups and phenyl groups. The functional groups are hydroxyl groups and alkoxy groups which are bonded to silicon. The following are examples of organopolysiloxanes which can be used as component (B) in this invention.

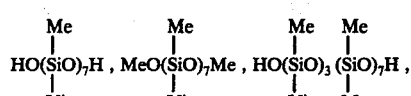

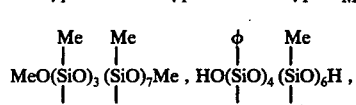

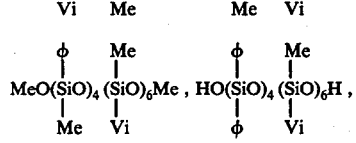

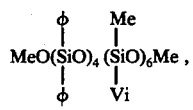

-continued

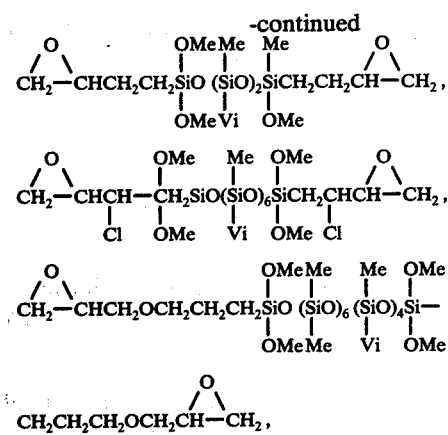

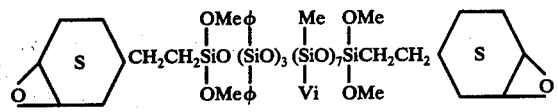

wherein φ is phenyl, Me is methyl and Vi is vinyl.

When the amount of added organopolysiloxane component (B) is less than 0.1 parts by wt. per 100 parts of siloxane (A) adhesion with silicone rubbers cannot be obtained. When the amount of (B) is excessively large, the film characteristics of the organopolysiloxane resins are weakened. It is desirable therefore to add 0.1-20 parts by weight of organopolysiloxane (B) for 100 parts by weight of organopolysiloxane resin component (A). Organic solvents and catalysts for low temperature curing can be added. The organic solvents that can be added include aromatic, aliphatic, and chlorinated solvents.

The aromatic organic solvents can be, for example, benzene, toluene, xylene, trimethylbenzene, tetramethylbenzene and diethylbenzene. The aliphatic organic solvents can be, for example, cyclohexane, methylcyclohexane and dimethylcyclohexane. The chlorinated organic solvents can be, for example, trichloroethylene, 1,1,1-trichloroethane, carbon tetrachloride and chloroform.

The following low temperature curing catalysts for organopolysiloxane resins are known to be usable. They are: aminoalkylalkoxysilane as disclosed in the U.S. Pat. No. 3,350,349; alkenylacetoxysilane disclosed in the U.S. Pat. No. 2,615,861; and basic amino compounds disclosed in the Japanese Patent Publication No. 15937/61. They are effective as catalysts for organopolysiloxane resins having hydroxyl groups bonded to the silicon atoms. Specific examples of such catalysts are γ-aminopropyltrimethoxysilane, methyl-γ-(aminoethyl)-aminopropyldimethoxysilane, γ-dimethylaminopropyltrimethoxysilane, vinyltriacetoxysilane, brucine, secondary butylamine, diethylbenzylamine, dimethylamine, dimethylaminomethylphenol, tetramethylenediamine, triisobutylamine and trimethylenediamine.

The catalysts for organopolysiloxane resins having alkoxy groups bonded to the silicon atoms include titanium esters disclosed in the Japanese Patent Publication No. 1430/57. Specific examples are titanium esters of monovalent alcohols, such as ethyl, isopropyl, butyl, cyclohexyl, octyl and octadecyl alcohol; titanium esters of divalent alcohols, such as ethylene glycol, propylene glycol, octylene glycol, diethylene glycol, tripropylene glycol, and tetraethylene glycol; and titanium esters of trivalent alcohols, such as glycerin. In order to cure at room temperature and to obtain stable one-part organopolysiloxane resins, aminoalkylalkoxysilane and alkylalkoxysilane or alkenylalkoxysilane can be added and mixed in the organopolysiloxane solution containing hydroxyl groups bonded to silicon. By adding certain known organic tin compounds as condensation catalyts, the "set to touch" time can be further shortened and the workability improved.

The invention will be explained with actual examples and comparison samples. In the examples and comparison samples, the "parts" mean parts by weight. The abbreviations Me is methyl, Et is ethyl, Ph is phenyl, Pr is propyl and Vi is vinyl respectively.

COMPARISON SAMPLE 1

A room temperature curing type silicone resin solution was prepared by adding 5 parts of γ-(aminoethyl)-aminopropyltrimethoxysilane, 15 parts of methytrimethoxysilane, and 0.5 parts of dibutyl tin acetate to 100 parts of a 50 wt% xylene solution of a phenylmethylpolysiloxane resin having 1.50 organic groups per silicon atom (the ratio of phenyl groups to methyl groups = 0.578) and also containing 0.5 wt% of hydroxyl groups. Using this solution, the primer compounds shown in Table I were prepared. The compounds were coated on a cold pressed steel plate according to the procedure in JIS G-3141, and dried with air for 1 hour.

0.4 parts of a commercial peroxide vulcanizing agent (RC-4) manufactured by the Toray Silicone Co. were added to 100 parts of a silicone rubber stock prepared by admixing 100 parts of a base stock containing 100 parts of an essentially dimethylsiloxane gum containing vinyl substituents, 35 parts of reinforcing silica, 1.5 parts of hydroxyl containing dimethylsiloxane fluid as plasticizer, 40 parts diatomaceous earth, 3 parts of a known oil stability additive and a small amount of low molecular weight vinyl containing siloxane. After it was mixed and kneaded with twin rollers, the mixture was press molded on the primer-treated steel plates at 170° C., for 10 minutes under a pressure of 200 kg/cm². It was removed from the metal mold.

This example shows that conventional primer materials such as vinylmethoxysilane, methacryloxypropyltrimethoxysilane, or mixtures of them, in a silicone resin solution, were not effective for bonding the silicone rubber to a steel substrate.

Primer reference 1 contained only the silicone resin for a control. Thereafter, reference numbers 2-5 contained 3 and 5 parts of either vinylmethoxysilane or methacryloxypropyltrimethoxysilane with the result that in each case, there was no adhesion to the steel substrate.

TABLE 1

| Primer reference | Silicone resin solution (parts) | Vinyl-methoxysilane parts | Methacryloxy-propyltrimethoxy-silane (parts) | Adhesion |
|---|---|---|---|---|
| 1 | 100 | 0 | 0 | None |
| 2 | 100 | 3 | 0 | None |
| 3 | 100 | 5 | 0 | None |
| 4 | 100 | 0 | 3 | None |
| 5 | 100 | 0 | 5 | None |

COMPARISON SAMPLE 2

Toray Silicone SH 2260, which is a commercial primer for silicone rubbers, was coated on a cold pressed steel plate, and dried with air for 30 minutes.

One part of vulcanizing agent RC-4 manufactured by Toray Silicone Co. was added to 100 parts of 1:1 mixture of silicone rubbers manufactured by the Toray Silicone Co., Tokyo, Japan.

The first silicone rubber was a vinyl containing silicone rubber wherein the vinyl is located on the ends of a polydimethylsiloxane polymer. It also contained a reinforcing silica filler, 1 part of a standard heat stability additive and 0.2 parts of a standard compression set additive. The second silicone rubber was similar to the first silicone rubber but it contained a mixture of vinyl containing siloxanes.

After it was mixed and kneaded with twin rollers, the mixture was press molded on the steel plate at 170° C. for 10 minutes, at a pressure of 200 kg/cm². The measurement according to JISK 6301 showed 100% cohesive rupture. The adhesion was satisfactory, but when it was left at room temperature for 20 days, rust spots formed on the steel plate.

EXAMPLE 1

A toluene solution that contained 60 wt% of phenylmethylpolysiloxane resin containing an averge of 1.29 phenyl groups and methyl groups per silicon atom (the ratio of phenyl groups to methyl groups = 0.43) and also having 4.0 wt% of hydroxyl groups was designated C. An organopolysiloxane resin solution prepared by mixing 5 parts of γ-aminoethylaminopropyltrimethoxysilane, 15 parts of methyltrimethoxysilane, and 0.5 parts of dibutyltinacetate in 100 parts of a xylene solution of 50 wt% organopolysiloxane resins which contained an average of 1.50 phenyl groups and methyl groups per silicon atom (the ratio of phenyl groups to methyl groups is 0.57) and also contained 0.5 wt% of hydroxyl groups was designated D. By adding 1 or 2 of the organopolysiloxanes (B) shown below as indicated in Table II, the primer compounds were prepared.

force was conducted according to JIS K 6103. The results are shown in Table II.

TABLE 2

| Primer Reference | Organopolysiloxane resin solution C (parts) | Organopolysiloxane resin solution D (parts) | Organopolysiloxane 1 (parts) | Organopolysiloxane 2 (parts) | Adhesive Force kg/cm² |
| --- | --- | --- | --- | --- | --- |
| 6 | 100 | — | — | 2 | 8 |
| 7 | — | 100 | 1 | — | 8 – 10 |
| 8 | — | 100 | 3 | — | 8 – 10 |
| 9 | — | 100 | — | 1 | 13 – 14 (100% cohesive rupture) |
| 10 | — | 100 | — | 3 | 12 – 13 (100% cohesive rupture) |

Run Nos. 6, 7 and 8 are partial cohesive ruptures, and Nos. 9 and 10 are 100% cohesive ruptures. All of these runs show excellent adhesion between the steel plates and the silicone rubbers. The 5 types of primers used in Example 1 were coated on steel plates. After curing the primers under the same conditions as before, they were left at room temperature for 20 days. Formation of rust was not observed in any of them. Using these steel plates which were treated with primers and left for 20 days, press-molding was conducted using silicone rubbers, vulcanizing agents, and the same conditions as in Comparison Sample 2. The adhesive force was measured. In all cases, there were no negative effects on the adhesive force caused by the time lapse.

EXAMPLE 2

2 parts of the organopolysiloxane 2 used in Example 1 were added to 100 parts of organopolysiloxane resins composed of 20 mol% monophenylsiloxane, 15 mol% monovinylsiloxane, and 65 mol% monomethylsiloxane having on the average 0.5 methoxy groups per silicon atom. One part of tetrabutyl titanate was added to this mixture. The mixture was coated on a cold pressed steel plate, and dried with air for 24 hours. It was press-molded using silicone rubbers, vulcanizing agents, and the same conditions as in Comparison Sample 2. The measured adhesive force was 13 kg/cm², and it was a 100% cohesive rupture. These primer compounds were excellent in rust resistance because they formed films on the cold pressed steel plates.

EXAMPLE 3

A test panel 50 × 500 × 5 mm was prepared by transfer molding a silicone molding compound prepared by mixing glass fibers and a lead catalyst with a Organopolysiloxane 1:
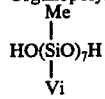

Organopolysiloxane 2:
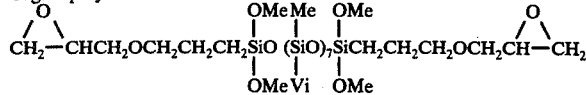

The cold pressed steel plates were treated with these primers. The primer using organopolysiloxane resin C solution was cured at 150° C. for 30 minutes, and a film was formed. The primer using organopolysiloxane D was dried at room temperature for one hour, and the film was formed. Using the same silicone rubbers and vulcanizing agents as in Comparison Sample 2, press-molding on the steel plates was carried out under the same conditions. The measurement of the adhesive silicone resin containing 45 mol% $MeSiO_{3/2}$ units, 40 mol% $PhSiO_{3/2}$ units, 5 mol% PhMeSiO units and 10 mol% $Ph_2SiO$ units. The molding conditions were 175° C., 63 kg/cm² (pressure), and 5 min. Run No. 9 primer from Example 1 was coated on this test panel. After 30 minute drying with air, the silicone rubber of Comparison Sample 2 was press-molded under the same condi- That which is claimed is:

1. A composition of matter which is useful as an adhesion promoter for silicone rubbers which consists of a mixture of 100 parts of (A) an organopolysiloxane resin which has the general formula $$[R'_n X_m SiO_{\frac{4-m-n}{2}}]_p$$

in which formula,

R' is a monovalent hydrocarbon radical containing 1–8 carbon atoms, $n$ has an average value of 0.90–1.80, X is a hydroxyl group or an alkoxy group, $m$ is such to give a value of not less than 0.1 weight percent of X based on the weight of (A), the sum of $m + n$ does not exceed 3, $p$ has a value greater than 1, and 0.1 to 20 parts of (B) an organopolysiloxane represented by the general formula $$[R^2_a SiO_{\frac{4-a-b-c}{2}}]_q [R^5_d SiO_{\frac{4-d-e-f}{2}}]_r$$
$$\phantom{xx}|\phantom{xxxxxxxxxx}|$$
$$(OR^3)_b\phantom{xxxxxxx}(OR^3)_e$$

with $R^4_c$ on the first unit and $R^4_f$ on the second unit, wherein $R^2$ is a monovalent organic group containing at least one epoxy group, $R^3$ and $R^4$ are independently hydrogens or monovalent hydrocarbon radicals, $R^5$ is a monovalent hydrocarbon radical containing at least one unsaturated group, $a$, $b$, $c$, $d$, $e$ and $f$ each have the value of 0–3 and the sum of $a$, $b$ and $c$ is 3 and the sum of $d$, $e$ and $f$ is 3, $q$ is 0 or a positive integer and $r$ has a value of 2 or more.

2. The composition of claim 1 wherein the organopolysiloxane resin (A) is a resin solution which consists of a mixture of α-(aminoethyl)-aminopropyltrimethoxysilane; methyltrimethoxysilane; a xylene solution of 50 weight percent organopolysiloxane resin which has a ratio of organic groups to silicon atoms of 1.50/1 and which contains 0.5 weight percent of hydroxyl groups and, (B) is $$\text{HO(SiO)}_7\text{H}$$
with Me and Vinyl substituents.

* * * * *